(12) United States Patent
Ito et al.

(10) Patent No.: US 7,220,515 B2
(45) Date of Patent: May 22, 2007

(54) PRESSURE FLUCTUATION PREVENTION TANK STRUCTURE, ELECTROLYTE CIRCULATION TYPE SECONDARY BATTERY, AND REDOX FLOW TYPE SECONDARY BATTERY

(75) Inventors: Takefumi Ito, Osaka (JP); Nobuyuki Tokuda, Osaka (JP)

(73) Assignees: Sumitomo Electric Industries, Ltd., Osaka (JP); Kansai Electric Power Co., Inc., Osaka (JP)

( * ) Notice: Subject to any disclaimer, the term of this patent is extended or adjusted under 35 U.S.C. 154(b) by 589 days.

(21) Appl. No.: 10/220,023

(22) PCT Filed: Oct. 26, 2001

(86) PCT No.: PCT/JP01/09460

§ 371 (c)(1),
(2), (4) Date: Aug. 26, 2002

(87) PCT Pub. No.: WO02/50937

PCT Pub. Date: Jun. 27, 2002

(65) Prior Publication Data

US 2003/0022059 A1 Jan. 30, 2003

(30) Foreign Application Priority Data

Dec. 6, 2000 (JP) .............................. 2000-371148

(51) Int. Cl.
*H01M 2/40* (2006.01)
*H01M 8/20* (2006.01)
*B65D 81/00* (2006.01)

(52) U.S. Cl. .......................... 429/72; 429/81; 429/105; 220/723

(58) Field of Classification Search ..................... None
See application file for complete search history.

(56) References Cited

U.S. PATENT DOCUMENTS 6,155,449 A * 12/2000 Moriyama .................. 220/565
6,190,760 B1   2/2001 Nagai et al.

(Continued)

FOREIGN PATENT DOCUMENTS

CN        2064651 U       10/1990

(Continued)

OTHER PUBLICATIONS

Gu, Jun., et al. "Progress of research on vanadium redox flow battery Part I Principles and progress of the battery," Chinese Journal of Power Sources, vol. 24, No. 2, Apr. 2000, pp. 116-117, www.cnkl.net English Abstract on p. 116.

*Primary Examiner*—Jonathan Crepeau
(74) *Attorney, Agent, or Firm*—McDermott Will & Emery LLP

(57) ABSTRACT

A simplified, pressure-variation preventing tank structure capable of preventing pressure variations in a gas phase portion resulting from temperature variations, without bringing stored liquid into contact with air. This pressure-variation preventing structure includes a breather bag arranged in a gas phase portion of a tank and inflating/deflating in communication with outside air, and a manhole to which the breather bag is attached to suspend in a gas phase portion, including a communication hole for the breather bag to communicate with outside air. The breather bag has air-blocking, acid-resistant and expandable characteristics.

11 Claims, 5 Drawing Sheets

U.S. PATENT DOCUMENTS 6,527,002 B1 * 3/2003 Szakaly ................. 137/14
6,681,789 B1 * 1/2004 Moulis et al. ........... 137/14
6,716,499 B1 * 4/2004 Vadhar .................. 428/35.3

FOREIGN PATENT DOCUMENTS

| | | |
|---|---|---|
| CN | 1223198 A | 7/1999 |
| JP | 51-94008 | 7/1976 |
| JP | 62-31371 | 2/1987 |
| JP | 62-229665 | 10/1987 |
| JP | 2000-12065 | 1/2000 |
| JP | 2000-21433 | 1/2000 |
| WO | WO 93/18989 * | 9/1993 |
| WO | WO 99/47434 * | 9/1999 |

* cited by examiner

TANK INTERNAL PRESSURE: HIGH

TANK INTERNAL PRESSURE: LOW

PRESSURE FLUCTUATION PREVENTION TANK STRUCTURE, ELECTROLYTE CIRCULATION TYPE SECONDARY BATTERY, AND REDOX FLOW TYPE SECONDARY BATTERY

TECHNICAL FIELD

The present invention relates to a pressure-variation preventing tank structure capable of maintaining a constant internal pressure in a tank storing acid liquid, and an electrolyte-circulating type secondary battery and a redox flow secondary battery with the pressure-variation preventing tank structure.

BACKGROUND ART

When liquid is stored in a tank, the pressure in a gas-phase portion of the tank is variable, depending on the temperature of the stored liquid, on the reaction in a reaction portion of a battery cell, and the like. When the pressure difference between the inside and the outside of the tank is strictly limited, as in the case of a polyethylene tank etc., it is possible to make the tank a sealed structure by providing an air release valve or the like, for positive pressure. Furthermore, if the internal pressure in the tank may become negative because of a temperature drop of the stored liquid, the negative pressure is generally avoided by communicating with outside air or providing an intake valve to take in outside air.

When the stored liquid in the tank cannot be exposed to the outside air, for example when it is extremely vulnerable to oxidation, however, it is necessary to blow in and flow inert gas such as nitrogen so as to prevent the negative pressure. As a result, the inert gas for preventing the negative pressure must be reserved, resulting in an undesired cost increase.

If a sealed structure filled with inert gas is employed to prevent this, degradation including oxidization of the stored liquid by air can be avoided, while preventing the negative pressure. When the stored liquid is electrolyte for a redox flow secondary battery or the like, an endothermic reaction at the time of charging and an exothermic reaction at the time of discharging, as well as changes of outside air temperature raises the temperature of the stored liquid up to about 42° C. in operation and lowers down to about 10° C. at rest. Therefore, as temperature varies in the range of 10° C. to 42° C., pressure accordingly varies in the sealed structure. When we represent the variation of pressure P as $\Delta P$ and the variation of temperature T (absolute temperature) as $\Delta T$, $(\Delta P/P)=(\Delta T/T)$ holds, since volume change $\Delta V$ is zero in a sealed structure. By inputting the above value, $(\Delta P/P)=\{32/(273+42)\}\approx 0.1$ results, and the above noted temperature variation causes a variation of about 0.1 atmosphere in operation under normal pressure. If an electrolyte tank for a redox flow secondary battery, for example, is to withstand this pressure variation of about 0.1 atmosphere, the structure thereof needs to be considerably rigid, which boosts up the cost of the entire battery system. The pressure-resistant performance of an inexpensive polyethylene tank or the like, fabricated by rotational molding etc. is at most about 0.01 atmosphere for positive pressure variation, and no more than about 0.005 atmosphere for negative pressure variation. In case of the electrolyte tank for the redox flow secondary battery, it is impossible to implement a tank having so rigid a structure that can withstand the pressure variation as mentioned above, due to the constraint of locational conditions or power generation costs.

DISCLOSURE OF THE INVENTION

Therefore, it is an object of the present invention is to provide a simplified, pressure-variation preventing tank structure capable of preventing a pressure variation resulting from a temperature variation in a gas phase portion without bringing stored liquid into contact with air, an electrolyte-circulating type secondary battery, and a redox flow secondary battery.

In the pressure-variation preventing tank structure in accordance with the present invention, the pressure-variation preventing structure is for a tank in which electrolyte circulated for use is stored. This pressure-variation preventing structure includes a breather bag arranged in the gas phase portion of the tank and inflating/deflating in communication with outside air, and a breather bag attaching portion attaching the breather bag to the tank, including a communication hole for the breather bag to communicate with outside air. The breather bag has air-blocking, acid-resistant, and expandable characteristics.

Since the electrolyte is circulated for use in the above noted tank, the amount of electrolyte in the tank is almost constant. Pressure variations in the tank are caused mainly by temperature variations. In the above noted structure, when falling temperature is likely to create negative pressure in the gas phase portion, outside air enters the breather bag from the communication hole and inflates the breather bag and the volume of the gas phase portion is substantially decreased, so that creation of negative pressure can be prevented. On the other hand, when rising temperature is likely to create positive pressure, air escapes from the communication hole to the outside and the breather bag is deflated to substantially increase the volume of the gas phase portion, so that the rise of positive pressure can be prevented. Here, since the breather bag has air-blocking characteristics, the outside air into and out of the breather bag is not substantially brought in contact with the liquid vulnerable to oxidization. In case of electrolyte for a redox flow secondary battery, if the air permeability exceeds 90 cc/($m^2 \cdot 24$ h·atm), divalent vanadium ions in sulfuric acid of the electrolyte is oxidized by air to produce trivalent vanadium ions, which inhibit the normal operation. Therefore, the above noted air-blocking characteristics are preferably an air permeability of not more than 90 cc/($m^2 \cdot 24$ h·atm). Further, because of the acid resistance, even if the breather bag is in contact with acid liquid, it is not corroded by the acid solution. In addition, because of the expandability, the breather bag can inflate/deflate according to a small temperature variation and prevent a pressure variation resulting from the small temperature variation.

Preferably, in the pressure-variation preventing tank structure in accordance with the present invention, the tank is substantially formed of organic resin.

A redox flow secondary battery is installed, for example, in a plant and the like having a huge electricity demand, and is used to charge inexpensive, excessive power at night and discharge at the peak of the demand in the day time. Accordingly, it is preferable that a polyethylene tank or a tank made of organic resin such as vinyl chloride is used as an electrolyte tank rather than a steel tank with acid resistant lining etc., in view of construction, ground strength and entire system costs, as long as safety is guaranteed. A polyethylene tank, in particular, is inexpensive and easy to construct, and therefore preferable for the above noted application. A disadvantage of an organic resin tank, however, is that it is vulnerable to a pressure variation, in particular to negative pressure. Since the pressure-variation preventing tank structure can prevent a pressure variation in a simplified manner without major reconstruction work, it is particularly effective to apply this structure to an organic resin tank. Consequently, it becomes possible to make inexpensive an entire system of a redox flow secondary battery and then to promote the widespread use thereof.

In the pressure-variation preventing tank structure in accordance with the present invention, the breather bag is formed of a metal film and film-like resin disposed outside the metal film.

A metal film is superior in blocking air but inferior in acid resistance. Then, a film-like resin is arranged outside the metal film so that both air-blocking and acid resistant characteristics are realized. Further, even if the metal film is made thin to an extent that the expandability is not inhibited, the air-blocking characteristics are not lost, and even if the film-like resin is made thin enough to secure the expandability, the acid resistance is not lost. Preferably, the metal film is sandwiched between the film-like resin to form a three-layered structure. In this three-layered structure, the layers may be separated with each other. Alternatively, it may be a bonded structure in which a metal film is formed on film-like resin by vapor deposition. The rigidity can be smaller when a plurality of layers are separated with each other than when the layers are bonded together to be thick, whereby the expandability can be effectively assured. It is noted that the metal film may be coated with resin or may be adhered to film-like resin by adhesive, as long as the expandability is assured. Normally, aluminum foil is used for the metal film. When the breather bag is formed using such a composite film, the breather bag can have excellent air-blocking, acid-resistant and expandable characteristics.

In the pressure-variation preventing tank structure in accordance with the present invention, the breather bag includes a flange portion. The flange portion is jointed to the breather bag attaching portion.

Because of this structure, the breather bag can be made compact, the construction work becomes easy, and the system cost can be reduced as a construction period is shortened, for example.

In the pressure-variation preventing tank structure in accordance with the present invention, the breather bag attaching portion is provided at a manhole arranged on a ceiling wall of the tank, and the communication hole is formed of a hole provided at the manhole.

The manhole is separated from the other part which forms the tank wall, so that it is easy to provide the breather bag attaching portion including the communication hole. The breather bag is basically supported at the breather bag attaching portion. Alternatively, the breather bag is supported to hang down from the manhole portion, as the breather bag is light in weight.

The pressure-variation preventing tank structure in accordance with the present invention further includes a vent valve provided with a diaphragm passing gas in the gas phase portion only in a direction from the inside to the outside of the tank and not passing external gas outside the tank in a direction toward the gas phase portion.

The above noted vent valve can exhaust the gas in the gas phase portion externally, to suppress the rise of positive pressure when positive pressure is likely to increase above a permissible limit. In exhausting the gas, the external gas does not intrude into the gas phase portion to be in contact with the electrolyte, so that the operation of the redox flow secondary battery is not hindered, for example. Therefore, when the rise of positive pressure is not suppressed even after the breather bag completely deflates, the pressure rise in the gas phase portion can be suppressed by operating this vent valve. Meanwhile, the breather bag can effectively prevent negative pressure.

It is preferable that the function is shared in such a manner that the breather bag is attached in a deflated state and when the pressure further rises, the vent valve is operated, while the breather bag is operated when negative pressure is created. In this way, the volume change of the breather bag is utilized only for preventing negative pressure, so that even with the same volume change of the breather bag, it can cope with a bigger temperature drop $\Delta T$.

In an electrolyte-circulating type secondary battery in accordance with the present invention, electrolyte for use in charging/discharging reactions is stored in a tank having any of the aforementioned pressure-variation preventing tank structure of the present invention.

A pressure variation caused by a temperature variation in the aforementioned electrolyte or ambient air can be prevented by the breather bag, so that the tank of the electrolyte-circulating type secondary battery can be made in a simple structure. Specifically, reduction in size, material and construction costs and weight can be realized.

In a redox flow secondary battery in accordance with the present invention, electrolyte for redox-flow type charging/discharging reactions is stored in a tank having any of the aforementioned pressure-variation preventing tank structure of the present invention.

Because of the above noted structure, the redox flow secondary battery including the above tank can be installed and used in a plant or the like, to promote the wide-spread use thereof as an inexpensive system. In these installation locations, it is often difficult to construct a steel tank resistible to a temperature variation with acid resistant lining etc., in view of space, ground strength, construction cost and the like, because the tank and the like are built in an existing building. Then, if a redox flow secondary battery with a tank having the above pressure-variation preventing tank structure is used, the above redox flow secondary battery system can be installed in a flexible manner according to the existing building.

The foregoing and other objects, features, aspects and advantages of the present invention will become more apparent from the following detailed description of the present invention when taken in conjunction with the accompanying drawings.

BEST MODES FOR CARRYING OUT THE INVENTION

Embodiments of the present invention will now be described with reference to the figures.

(First Embodiment)

Figure 1:
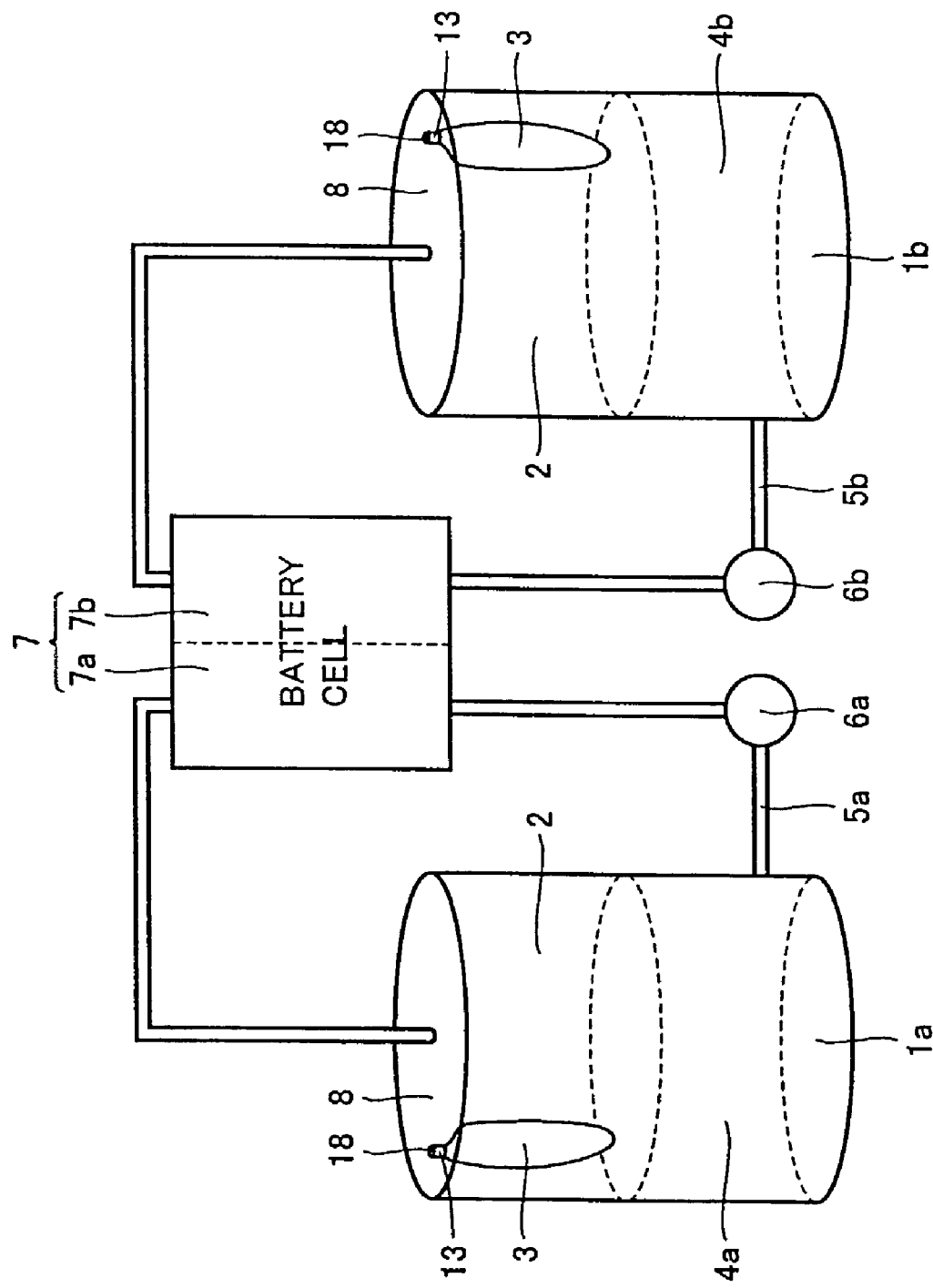
FIG. 1 schematically shows a redox flow secondary battery to which a pressure-variation preventing tank structure in a first embodiment of the present invention is applied.

First, a first embodiment in which a pressure-variation preventing tank structure of the present invention is applied to a redox flow secondary battery will be described. Referring to FIG. 1, in a battery cell 7 of a redox flow secondary battery, positive electrolyte 4a is circulated in a positive electrode cell 7a and negative electrolyte 4b is circulated in a negative electrode cell 7b. A positive electrolyte pump 6a and a negative electrolyte pump 6b are respectively used to circulate positive electrolyte 4a and negative electrolyte 4b. The pressure-variation preventing tank structure of the present invention is used for both of the electrolyte tanks no matter whether it is positive or negative, and therefore in the following the same description will be made for both of the positive and negative electrolytes. The electrolyte tank is a polyethylene tank in both the positive and negative electrolyte tanks. It is noted that the positive electrolyte is sulfuric acid containing quadrivalent and pentavalent vanadium ions, and the negative electrolyte is sulfuric acid containing divalent and terbalent vanadium ions.

Figure 2:
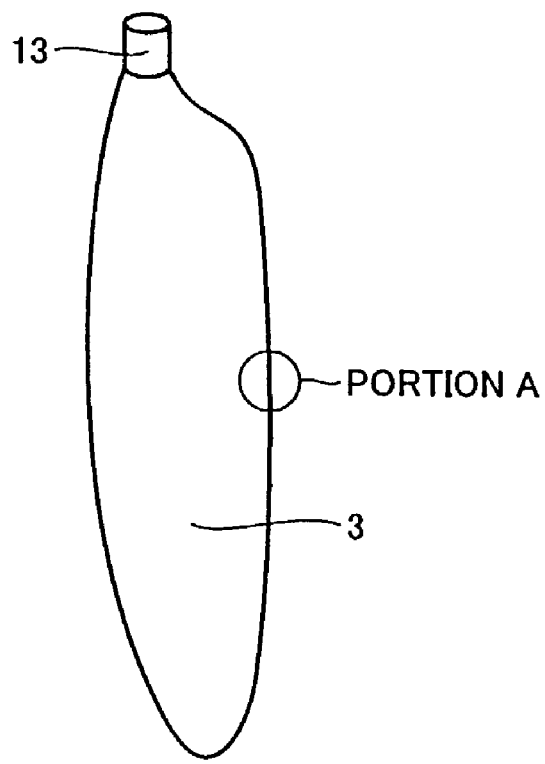
FIG. 2 shows a breather bag in FIG. 1.
Figure 3:
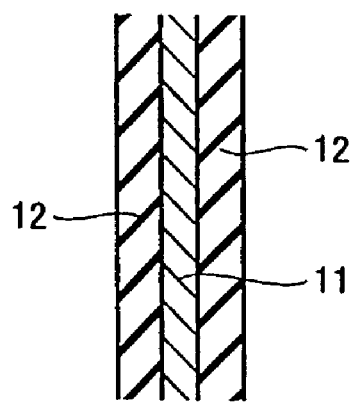
FIG. 3 is an enlarged view of portion A of the breather bag in FIG. 2.

In the electrolyte tank, a breather bag 3 is hung down from a ceiling wall 8 of a gas phase portion 2. Breather bag 3 is formed of a composite material made of aluminum foil 11 and film-like resin 12 as shown in FIG. 2 and FIG. 3 as an enlarged view of A in FIG. 2. The aluminum foil and the film-like resin may be bonded by vapor deposition or the like, or may be separated with the opening of the breather bag only being adhered, since with the increased thickness, the rigidity increases and thus the expandability reduces. As to the expandability, that is, responsiveness to pressure, the following performance is required. For example, the temperature of the electrolyte decreases by about 3° C. due to an endothermic reaction, from the discharging state to charge completed state of the redox flow secondary battery. When a breather bag of 1.5 m$^3$ is attached to a 15 m$^3$ gas phase portion, for example, the breather bag needs to inflate at the rate of 2.5 liters per minute if charging is completed in an hour. Therefore, preferably, the breather bag has such expandability that allows for a volume change of 0.0015 m$^3$/(m$^3$·min) or more.

The aluminum foil is superior in blocking air and the film-like resin is superior in acid resistance. When the air permeability exceeds 90 cc/(m$^2$·24 h·atm), divalent vanadium ions in the electrolyte is oxidized to produce trivalent vanadium ions, which hinders the normal operation. Therefore, for the air blocking characteristics, the air permeability is desirably not more than 90 cc/(m$^2$·24 h·atm), which can be easily realized using aluminum foil. The opening portion of the breather bag is provided with a flange portion 13 formed by binding the aluminum foil and the film-like resin together and welded in communication with a communication hole of a ceiling wall.

Figure 4:
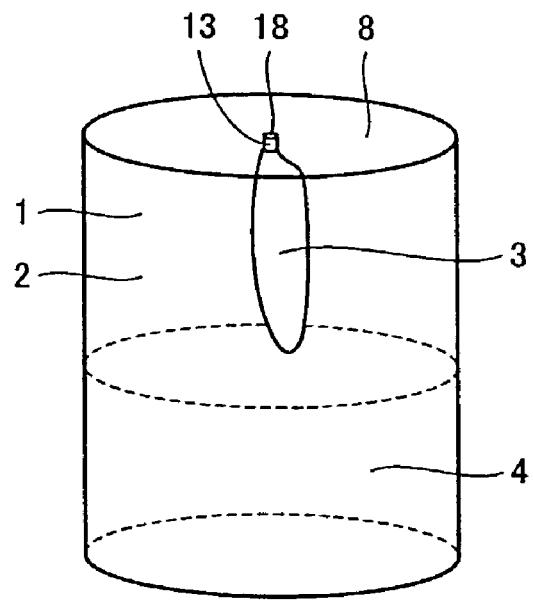
FIG. 4 shows the status of the breather bag when the internal pressure in the tank is high, in accordance with the first embodiment.
Figure 5:
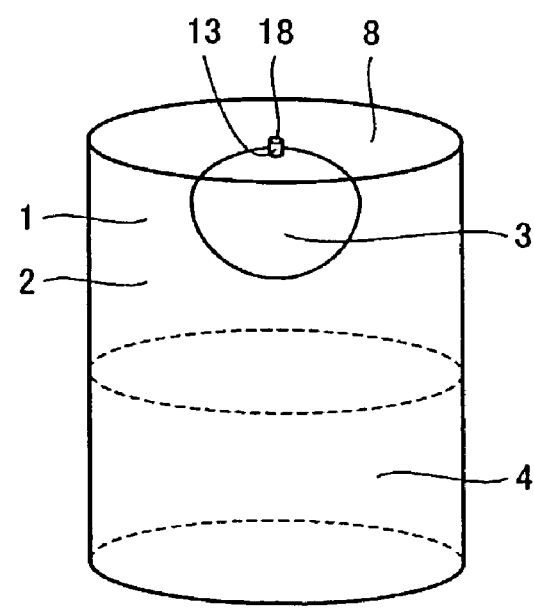
FIG. 5 shows the status of the breather bag when the internal pressure in the tank is low, in accordance with the first embodiment.

The function of the breather bag will now be described. When the tank internal pressure, that is, the pressure in the gas phase portion increases, the breather bag deflates as shown in FIG. 4. Therefore, when the tank internal pressure increases, that volume of the gas phase portion which can be decreased by the breather bag volume is reduced. Accordingly, the increase of the tank internal pressure is canceled by a substantial increase of the volume of the gas phase portion, so that increase in the internal pressure is prevented. On the other hand, when the tank internal pressure decreases, the breather bag inflates, as shown in FIG. 5, and the volume of the gas phase portion is significantly decreased by the volume of the breather bag. Accordingly, the decrease in the internal pressure is cancelled by the decrease of the volume of the gas phase portion, so that decrease in the internal pressure is prevented.

With pressure P, pressure variation $\Delta P$, volume of the gas phase portion V, the volume variation of the gas phase portion $\Delta V$, temperature T, temperature change $\Delta T$, the number of moles of gas in the gas phase portion n, and gas constant R, $PV=nRT$ holds. Assuming that there is no gas incoming and outgoing, when a logarithmic derivative is obtained from this equation, $(\Delta P/P)+(\Delta V/V)=(\Delta T/T)$ holds. Now, a volume variation that can prevent pressure variation $\Delta P$ when there is a temperature variation is found. If $\Delta P=0$ in the above equation, $(\Delta V/V)=(\Delta T/T)$ holds. In case of the electrolyte of the above noted redox flow secondary battery, as the maximum temperature in operation is 42° C., the minimum temperature at rest is 10° C., and a temperature variation is thus 32° C., T=273+42=315 (K) and $\Delta T$=32 (K). Therefore it is estimated that $(\Delta V/V)=(\Delta T/T)\approx 0.1$. Specifically, if an electrolyte tank has a gas phase portion having a volume of 15 m$^3$, a breather bag capable of volume change $\Delta V$ of about 1.5 m$^3$ should be attached.

As described above, in the pressure-variation preventing tank structure in accordance with the present invention, the breather bag substantially inflates at the time of a temperature drop in the gas phase portion and deflates at the time of a temperature rise in the gas phase portion such that it prevents a pressure variation in the gas phase portion of the tank due to a temperature change in the gas phase portion and keeps a constant pressure. Specifically, in a sealed tank which keeps out air, the breather bag adjusts the volume of the gas phase portion according to a temperature variation, so that pressure variation is prevented. Therefore, the above sealed tank does not need any measures against pressure variation, particularly negative pressure. As a result, a simple polyethylene tank or the like can be used to form an electrolyte-circulating type secondary battery, in particular a redox flow secondary battery, so that the system itself can be inexpensive, which, for example, contributes to the widespread use of redox flow secondary batteries.

Figure 6:
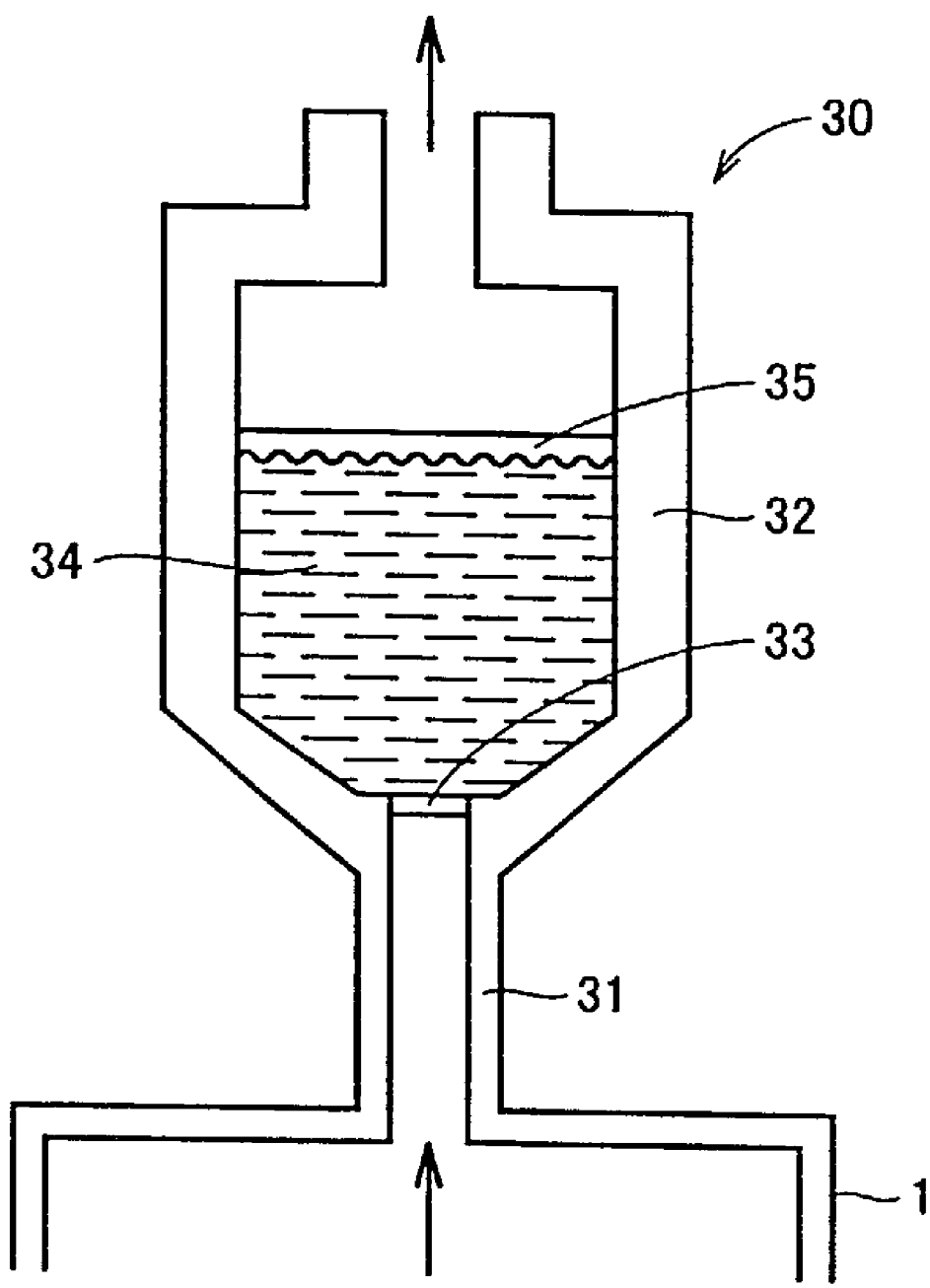
FIG. 6 shows a structure of a vent valve additionally attached to the tank in accordance with the first embodiment.

It is noted that the pressure-variation preventing tank structure may include a vent valve shown in FIG. 6, exhausting gas only to the outside. This vent valve 30 is provided with a water repellent porous membrane 33 arranged on the entire sectional surface of a piping portion 31 continuous to the piping portion which is communicated with tank 1. This water repellent porous membrane 33 does not pass upward stored water 34 and passes only the gas in the gas phase portion of the tank toward upward water 34. Further, a non-volatile paraffin layer 35 is arranged to cover the entire surface of water 34. This non-volatile paraffin layer itself does not volatilize and does not allow water to vaporize, thereby eliminating the need of maintenance.

Provision of vent valve 30 can prevent a pressure variation by emitting only the gas in the tank to the outside, even when the positive pressure in the tank rises to such an extent that cannot be addressed by the deflation of the breather bag. Vent valve 30 is effective to suppress rising of positive pressure but not effective to prevent negative pressure. For negative pressure, the breather bag can effectively operate. Therefore, it is desirable that the function is shared in such a manner that the breather bag is attached in a deflated state and when the pressure further rises, the vent valve is operated, while the breather bag is operated when negative pressure is created. Here, the volume change of the breather bag is utilized only for preventing negative pressure, so that even the same volume change of the breather bag can cope with a greater temperature drop $\Delta T$.

(Second Embodiment)

Figure 7:
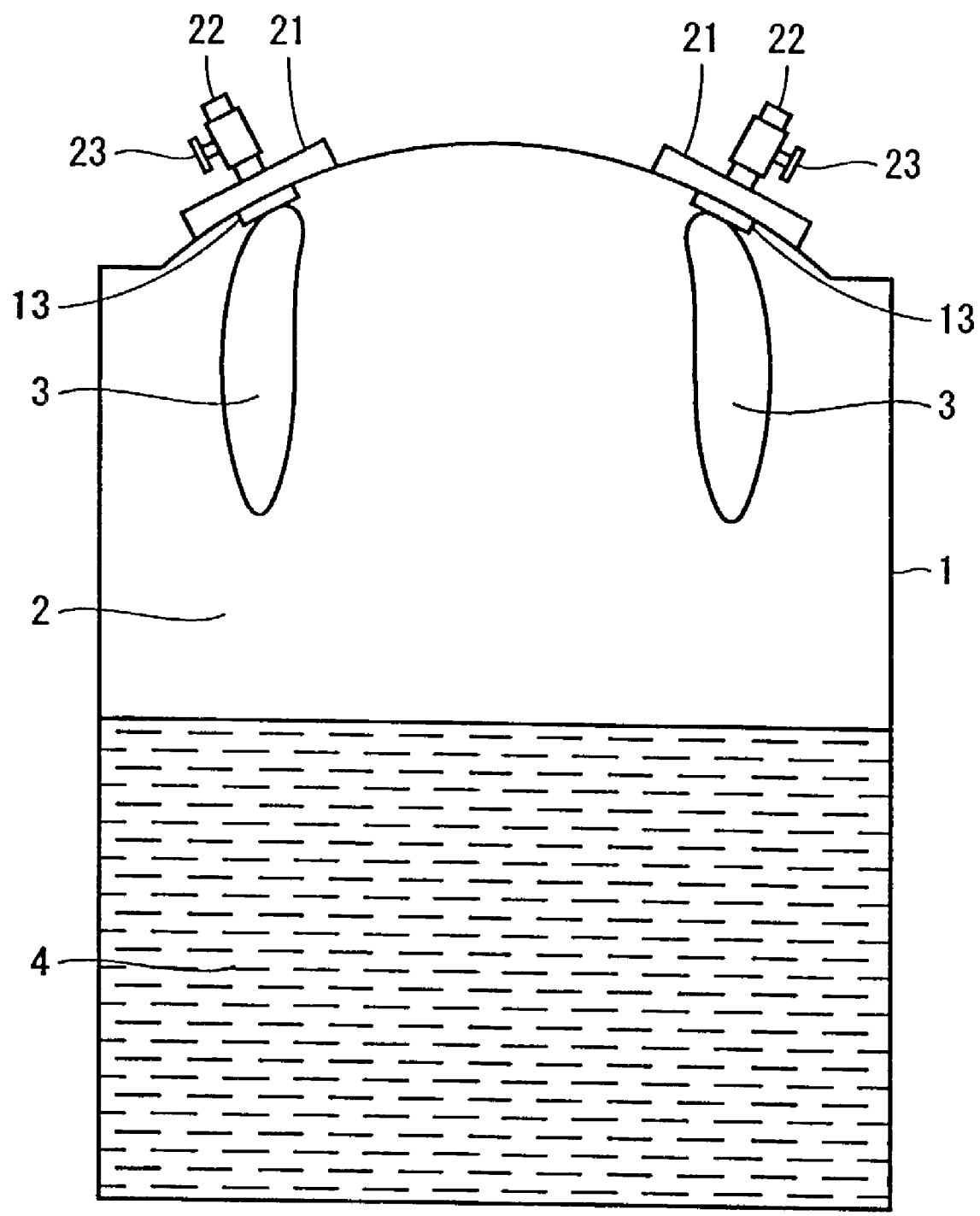
FIG. 7 shows the pressure-variation preventing tank structure in accordance with a second embodiment of the present invention.

FIG. 7 shows the pressure-variation preventing tank structure in accordance with a second embodiment of the present invention. Two breather bags 3 are attached to one polyethylene tank 1. The above noted manhole 21 is provided with a vent 22 having a valve 23, and flange portion 13 of the breather bag is attached to manhole 21 by welding to communicate with outside air through vent 22.

As illustrated in the first embodiment, if the volume of the gas phase portion is 15 $m^3$ and temperature change $\Delta T=32°$ C., approximately, volume change $\Delta V$ of about 10%, that is, about 1.5 $m^3$ is necessary. When a breather bag having a volume of about 1 $m^3$ is formed of the three-layered composite material shown in FIG. 3, the weight thereof is not more than 5 kgf. This weight affords its attachment to manhole 21. As shown in FIG. 7, provision of two breather bags can assure a volume change of about 10% of the volume of the gas phase portion. Depending on the magnitude of temperature changes, the number of breather bags can be arbitrarily set. Optionally, by providing the vent valve shown in FIG. 6, the breather bag may be operated mainly for preventing negative pressure. In this case, the same volume increase of the breather bag can cope with a much greater temperature change to prevent negative pressure.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A pressure-variation preventing tank structure for a tank in which electrolyte circulated for use is stored, comprising:
   a gas phase portion within the tank in the region above the upper surface of the electrolyte in the state in which the electrolyte is stored in the tank;
   a breather bag arranged in said gas phase portion of said tank and inflating/deflating in communication with outside air; and
   a breather bag attaching portion attaching said breather bag to the tank, including a communication hole for said breather bag to communicate with outside air; wherein
   said breather bag has air-blocking, acid-resistant and expandable characteristics, and has a three-layer structure formed by a metal film and two film-like resin layers arranged so that said metal film is interposed therebetween, and the breather bag is arranged to avoid contact with the electrolyte in the state in which the electrolyte is stored in the tank.

2. The pressure-variation preventing tank structure according to claim 1, wherein
   said tank is substantially formed of organic resin.

3. The pressure-variation preventing tank structure according to claim 1, wherein
   said breather bag includes a flange portion, and said flange portion is bonded to said breather bag attaching portion.

4. The pressure-variation preventing tank structure according to claim 1, wherein
   said breather bag attaching portion is provided at a manhole arranged on a ceiling wall of said tank, and said communication hole is formed of a hole provided at said manhole.

5. The pressure-variation preventing tank structure according to claim 2, wherein
   said breather bag attaching portion is provided at a manhole arranged on a ceiling wall of said tank, and said communication hole is formed of a hole provided at said manhole.

6. The pressure-variation preventing tank structure according to claim 3, wherein
   said breather bag attaching portion is provided at a manhole arranged on a ceiling wall of said tank, and said communication hole is formed of a hole provided at said manhole.

7. The pressure-variation preventing tank structure according to claim 1, further comprising
   a vent valve provided with a diaphragm passing gas in said gas phase portion outward and not passing external gas inward.

8. An electrolyte-circulating type secondary battery storing electrolyte for use in charging/discharging reactions in a tank having the pressure-variation preventing tank structure according to claim 1.

9. A redox flow secondary battery storing electrolyte for charging/discharging reactions in a tank having the pressure-variation preventing tank structure according to claim 1.

10. The pressure-variation preventing tank structure according to claim 1, adapted to store electrolyte of an electrolyte-circulating type secondary battery.

11. The pressure-variation preventing tank structure according to claim 1, adapted to store electrolyte of a redox flow secondary battery.

* * * * *